(12) United States Patent
Duca et al.

(10) Patent No.: US 10,712,427 B2
(45) Date of Patent: Jul. 14, 2020

(54) SYSTEMS AND METHODS FOR ALLOCATING ANTENNA RESOURCES

(71) Applicant: Raytheon Company, Waltham, MA (US)

(72) Inventors: John E. Duca, Waltham, MA (US); James L. Fulcomer, Waltham, MA (US); Jeffrey Bryan, Waltham, MA (US); Peter Hausman, Waltham, MA (US)

(73) Assignee: Raytheon Company, Waltham, MA (US)

( * ) Notice: Subject to any disclaimer, the term of this patent is extended or adjusted under 35 U.S.C. 154(b) by 288 days.

(21) Appl. No.: 15/726,866

(22) Filed: Oct. 6, 2017

(65) Prior Publication Data

US 2018/0143294 A1    May 24, 2018

Related U.S. Application Data

(60) Provisional application No. 62/405,116, filed on Oct. 6, 2016.

(51) Int. Cl.
*G01S 7/295* (2006.01)
*H04W 72/10* (2009.01)
(Continued)

(52) U.S. Cl.
CPC ............ *G01S 7/295* (2013.01); *G06F 9/4818* (2013.01); *G06F 9/5011* (2013.01); *H01Q 21/22* (2013.01);
(Continued)

(58) Field of Classification Search
CPC ........... H04W 72/042; H04W 72/0446; H04W 24/10; H04W 72/0413; H04W 72/046;
(Continued)

(56) References Cited

U.S. PATENT DOCUMENTS 7,630,380 B2   12/2009   Chung et al.
8,077,678 B2   12/2011   Kim
(Continued)

OTHER PUBLICATIONS

Invitation to Pay Additional Fees from related PCT Application No. PCT/US2017/055566 issued Jan. 22, 2018.

*Primary Examiner* — Daniel Lai
(74) *Attorney, Agent, or Firm* — Burns & Levinson, LLP; Joseph M. Maraia

(57) ABSTRACT

Systems and methods are presented for allocating resources. In particular, the systems and methods may receive and process a requested SP state to identify for first SP channel information regarding (i) signal processing resources required and (ii) state priority, based on a first state table defining for each of a plurality of states for the first SP channel information regarding signal processing resources required and state priority information; and based on the identified information, arbitrating as between a current state and a requested state. Systems and methods are also provided for fast blanking override of a requested signal processing (SP) state. In particular, the systems and methods may receive a blanking input and automatically override a requested SP state for a first SP channel based on using a first state table to determine blank susceptibility information for the requested SP state.

34 Claims, 10 Drawing Sheets

(51) Int. Cl.
*H01Q 21/22* (2006.01)
*G06F 9/50* (2006.01)
*G06F 9/48* (2006.01)
*H04W 52/28* (2009.01)
*H04W 72/12* (2009.01)
*G01S 13/02* (2006.01)
*G01S 7/38* (2006.01)

(52) U.S. Cl.
CPC ........... *H04W 52/28* (2013.01); *H04W 72/10* (2013.01); *H04W 72/1205* (2013.01); *G01S 7/38* (2013.01); *G01S 2013/0245* (2013.01); *G06F 2209/5021* (2013.01)

(58) Field of Classification Search
CPC ............. H04W 16/28; H04W 72/0406; H04W 72/0453; H04W 72/14; H04W 72/1268; H04W 16/14; H04W 52/146; H04W 72/10; H04W 72/1289; H04W 24/02; H04W 72/04; H04W 72/082; H04W 72/085; H04W 88/08; H04W 52/42; H04W 72/12; H04W 72/1284; H04W 16/10; H04W 16/32; H04W 28/06; H04W 28/16; H04W 52/143; H04W 52/242; H04W 52/245; H04W 56/001; H04W 72/00; H04W 72/02; H04W 72/0486; H04W 72/1205; H04W 72/1215; H04W 72/1231; H04W 72/1242; H04W 72/1273; H04W 72/1294; H04W 74/002; H04W 74/004; H04W 74/02; H04W 74/08; H04W 72/044; H04W 72/0466; H04W 72/048; H04W 72/06; H04W 72/08; H04W 72/121; H04W 72/1247; H04L 5/0048; H04L 5/0053; H04L 5/0055; H04L 5/0057; H04L 5/0023; H04L 5/0035; H04L 5/0091; H04L 5/0037; H04L 5/0039; H04L 5/0082; H04L 5/14; H04L 5/0044; H04L 5/0062; H04B 7/0617; H04B 7/0695; H04B 7/088; H04B 7/0632; H04B 7/0482; G01S 2013/0245; G01S 7/295; G01S 7/38; H01Q 1/246; H01Q 21/22; H01Q 3/00; H01Q 3/24

See application file for complete search history.

(56) References Cited

U.S. PATENT DOCUMENTS

| | | | |
|---|---|---|---|
| 8,155,063 | B2 | 4/2012 | Choi |
| 8,831,064 | B1* | 9/2014 | Kaviani ................. H04B 15/04 375/132 |
| 9,026,161 | B2 | 5/2015 | Noble et al. |
| 9,402,203 | B2 | 7/2016 | Mohseni et al. |
| 9,681,426 | B2 | 6/2017 | Seo et al. |
| 2013/0281145 | A1 | 10/2013 | Noble et al. |
| 2013/0300605 | A1* | 11/2013 | Celentano ................. H01Q 3/30 342/372 |
| 2014/0228035 | A1* | 8/2014 | Goldhamer ......... H04W 84/042 455/446 |
| 2015/0358989 | A1* | 12/2015 | Ni ..................... H04W 72/1226 370/330 |
| 2016/0055035 | A1 | 2/2016 | Hsu et al. |
| 2016/0095015 | A1 | 3/2016 | Mohseni et al. |

* cited by examiner

| | A | B | C | D | E | F | G | H | I | J | K | L | M | W |
|---|---|---|---|---|---|---|---|---|---|---|---|---|---|---|
| 1 | | Simulation | | | | | Hardware | | | | | | | |
| 2 | Raw Data | Status Captured | Absolute Time | Relative Time to Stimulus | | Raw Data | Status Captured | Absolute Time | Relative Time to Stimulus | Status Results Match? | Relative Time to Match? | | Time (clks) | Predicted Status |
| 9 | 000B2981 | Ch. 1 State Accepted | 2857 | 612 | | abb52b81 | Ch. 1 State Accepted | 11253035 | 612 | TRUE | TRUE | | | |
| 10 | 000C2242 | Ch. 0 State rejected | 3107 | 862 | | abb62542 | Ch. 0 State Rejected | 11253285 | 862 | TRUE | TRUE | | 850 | Ch 0 Reject |
| 11 | 000CE48B | Ch. 1 State Disabled | 3300 | 1055 | | abb6e68b | Ch. 1 State Disabled | 11253478 | 1055 | TRUE | TRUE | | 1050 | Ch1 Disabled, Ch0 Accept |
| 12 | 000CEB41 | Ch. 0 State Accepted | 3307 | 1062 | | abb6ed41 | Ch. 0 State Accepted | 11253485 | 1062 | TRUE | TRUE | | 1400 | |
| 13 | 0010A146 | Ch. 0 State Bumped, Arbiter/Priority | 4257 | 2012 | | abbaa346 | Ch. 0 State Bumped, Arbiter/Priority | 11254435 | 2012 | TRUE | TRUE | | 1750 | |
| 14 | 0010A181 | Ch. 1 State Accepted | 4257 | 2012 | | abbaa381 | Ch. 1 State Accepted | 11254435 | 2012 | TRUE | TRUE | | 2000 | Ch0 Bump, Ch1 Accept |
| 15 | 00128D83 | Ch. 1 State Bumped, External Blank | 4749 | 2504 | | abbc8f83 | Ch. 1 State Bumped, External Blank | 11254927 | 2504 | TRUE | TRUE | | 2500 | Ch1 Bump Blank, Ch0 Accept |
| 16 | 00129441 | Ch. 0 State Accepted | 4756 | 2511 | | abbc9641 | Ch. 0 State Accepted | 11254934 | 2511 | TRUE | TRUE | | | |
| 17 | 0013BE46 | Ch. 0 State Bumped, Arbiter/Priority | 5006 | 2761 | | abbd9046 | Ch. 0 State Bumped, Arbiter/Priority | 11255184 | 2761 | TRUE | TRUE | | 2750 | Ch0 Bump, Ch1 Accept |
| 18 | 0013BE81 | Ch. 1 State Accepted | 5006 | 2761 | | abbd9081 | Ch. 1 State Accepted | 11255184 | 2761 | TRUE | TRUE | | | |
| 19 | 00151F41 | Ch. 0 State Accepted | 5407 | 3162 | | abbf2141 | Ch. 1 State Bumped, Arbiter/Priority | 11255585 | 3162 | TRUE | TRUE | | 3150 | Ch1 Bump, Ch0 Accept |
| 20 | 00151F86 | Ch. 1 State Bumped, Arbiter/Priority | 5407 | 3162 | | abbf2186 | Ch. 0 State Bumped, Arbiter/Priority | 11255585 | 3162 | TRUE | TRUE | | | |
| 21 | 0015DF43 | Ch. 0 State Bumped, External Blank | 5599 | 3354 | | abbfe143 | Ch. 0 State Bumped, External Blank | 11255777 | 3354 | TRUE | TRUE | | 3350 | Ch0 Bump Blank, Ch1 Accept |
| 22 | 0015E681 | Ch. 1 State Accepted | 5606 | 3361 | | abbfe881 | Ch. 1 State Accepted | 11255784 | 3361 | TRUE | TRUE | | | |
| 23 | 0018A241 | Ch. 0 State Accepted | 6306 | 4061 | | abc2a441 | Ch. 0 State Accepted | 11256484 | 4061 | TRUE | TRUE | | 4050 | Ch1 Bump, Ch0 Accept |
| 24 | 0018A286 | Ch. 1 State Bumped, Arbiter/Priority | 6306 | 4061 | | abc2a486 | Ch. 1 State Bumped, Arbiter/Priority | 11256484 | 4061 | TRUE | TRUE | | | |

FIG. 6

SYSTEMS AND METHODS FOR ALLOCATING ANTENNA RESOURCES

CROSS REFERENCE TO RELATED APPLICATIONS

This application claims the benefit of U.S. Provisional Patent Application No. 62/405,116, filed Oct. 6, 2016, the disclosure of which is incorporated herein by reference in its entirety for all purposes.

BACKGROUND

1. Technical Field

This application relates to allocation of resources in electronic systems, such as antenna resources, based on received requests for the resources.

2. Discussion of Related Art

In many electronic systems, it is often desirable to manage the processing or servicing of multiple requests for a group of resources, particularly in situations in which there are often fewer resources available than there are requests for the resources. By way of specific example, in a radar system, it may be desirable to track, jam or otherwise counter multiple objects or targets simultaneously, and the radar system may not have sufficient resources to accommodate every available task.

Conventional resource management, for example, radar resource management, involves managing resources at very coarse-grained level, e.g., at the millisecond level. These conventional radar resource managers manage modes and dwell schedules, i.e., which modes will run and which dwells get scheduled, but they do not operate at the pulse level. Common scheduling algorithms currently include: artificial intelligent algorithms, Q-RAM algorithms, stochastic dynamic programming algorithms, waveform-aided algorithms, and adaptive update rate algorithms. Many priority queue structures that implement a first-in, first-out (FIFO) queue, but where higher-priority items are served first, exist. Also, hash functions which directly map a value to a memory address in a table also exist. Prior approaches also schedule resources a priori and do not mediate real-time contention for resources. Furthermore, many sorting algorithms exist to sort prioritized lists, but all of them take at best N log N time steps, assuming N elements, to sort, which is too slow for the applications to which the present disclosure is applicable, such as the radar application.

Other attempts recently have been made to solve the problem of allocation of resources by using a simple look-up table (LUT), in which all possible requests are mapped to all possible states; however, these LUT approaches are too resource inefficient and are too large to apply as the present disclosure is applied, since, for example, the LUT can become too large to implement in a FPGA or similar circuit. Also, these conventional LUT approaches do not ensure continuous automatic reconsideration of rejected requests to prevent forgetting of lower-priority requests. It is also noted that many of the prior approaches are primarily software solutions, which are dramatically slower than hardware solutions, in which the source of time delay is typically just combinational logic propagation delay. Moreover, scalability limitations exist as increased request inputs would require significantly more memory and logic resources. Furthermore, reconfiguration is typically slow required LUTs to be recomputed and reloaded. Other LUT approaches do not account for RAM latencies, yielding unrealistic timing estimates. Moreover, conventional systems and methods typically do not account for discrete blanking inputs since these would only increase the size and complexity of the LUT (rendering such impractical).

The subject Application relates to and improves upon PCT Application No. PCT/US2015/044443 and U.S. application Ser. No. 14/553,139 the contents of which are hereby incorporated herein in their entirety.

SUMMARY

The present disclosure is directed to an approach to arbitrating, allocating and otherwise managing multiple requests for signal processing resources, e.g., antenna resources. The approach of the disclosure is applicable in multiple situations in which the number of requests may greatly outweigh the number of resources being requested, and there is a need to switch between the multiple requests and resources very quickly. According to exemplary embodiments, in the case of a pulsed radar system, allocation of resources, such as jamming or sensing resources, can be allocated on a sub-pulse level, such that multiple threats can be jammed, and the system can switch between threats very quickly. According to the disclosure, each request may be associated with a priority level, based on the need of the requesting entity to have its request serviced by allocation to the resources. In some exemplary embodiments, the highest-priority requests are instantly allocated to resources, regardless of the current state of the resources According to the disclosure, in the case of the radar system application, the resources being requested and allocated can include multiple sub-apertures (elements) of a phased-array architecture. Each request may include identification of a specific configuration type, which refers to all valid combinations of elements of the array required to service the request, that is, for example, to transmit the specified radar signal. According to the exemplary embodiments, an architecture is provided to allow multiple resource requests for generally differing configuration types, having different priorities, to be made and resolved quickly. According to some exemplary embodiments, resource requests with the highest priority are allocated first. According to some exemplary embodiments, an ordered priority queue is also provided. The priority queue allows lower-priority resource requests to be continually reviewed for allocation to resources, such that missing or forgetting of lower-priority requests is avoided.

In exemplary embodiments, the systems and methods of the subject application provide for fast, pulse to pulse front-end control and resource allocation. In particular, the systems and methods disclosed herein may enable arbitration of incoming Signal Processor (SP) module receive/transmit requests in an extremely fast manner, e.g., under 100 ns. This rapid arbitration enables a faster response to new threats/requests as well as the rapid reuse of resources to deal with greater numbers of threats/requests, e.g., which may be particularly useful in implementation of Electronic-Warfare (EW) systems. To achieve these ends, the disclosed systems and methods advantageously utilize a novel priority and resource based algorithm to arbitrate between requests. The algorithm advantageously may provide for fast, real-time arbitration without the use of large look-up tables (LUTs). Rather, the systems and methods utilize only a small LUT to hold the priority and resource data. Moreover the arbitration may be implemented in field-programmable gate array (FPGA), e.g., using high speed digital signal processing (DSP) components for Subtract and Compare Circuit architecture (SaCC). The systems and methods may also advantageously implement look-through/blanking handled in real-time.

In exemplary embodiments, systems and methods are presented for arbitrating a signal processing (SP) request. The systems and methods may receive and process a requested SP state to identify for a first a SP channel information regarding (i) signal processing resources required and (ii) state priority, based on a first state table associated with the first SP channel, the first state table defining information for each of a plurality of states for the first SP channel including at least information regarding signal processing resources required and state priority information; and based on the identified information for the first SP channel regarding the signal processing resources required and the state priority, arbitrating as between a current state and a requested state. In exemplary embodiments, arbitrating between a current state and requested state may utilize a field programmable gate array and more particularly may utilize a compare circuit architecture (SaCC). In some embodiments, the priority information for the requested SP state may be compared against all quadrants. A win/may then be assigned for the requested SP state based on a checking of the most significant digit relative to the comparison results against all quadrants.

In further example embodiments systems and methods are disclosed for fast blanking override of a requested signal processing (SP) state. In particular, these systems and methods may receive and a blanking input and automatically override a requested SP state for a first SP channel based on using a first state table to determine blank susceptibility information for the requested SP state, the first state table defining information for each of a plurality of SP states for the first SP channel including blank susceptibility information for each of the plurality of SP states. Thus, in example embodiments, blanking logic may be used to compare the blank input relative to the blank susceptibility information for the requested SP state. Advantageously, this blanking logic may be implemented utilizing a field programmable gate array. In example embodiments, the blank susceptibility information may define a set of blanking inputs that would be capable of overriding the requested SP state. Blank susceptibility information can advantageously be different for different states. In further embodiments, the automatic overriding of the requested SP state may be configured for removing resources associated with the requested SP state from active state. In some embodiments, if the requested SP state is overridden, queue logic may be configured to perform arbitration on all other active requests in the system for different SP states on a priority basis. Thus, e.g., the overriding the requested SP state for the first SP channel may be configured to free up resources for a different SP state.

In the context of antenna resources, the term "SP state" may refer to one of a plurality of configurations types of a phased array system, the phased array system including a plurality of elements arranged in a particular geometry, wherein each configuration type is characterized by one or more geometric constraints defining a set of all possible configurations of the phased array that are able to satisfy resource requests of that configuration type, each configuration in the set of all possible configurations including a specific combination of one or more elements of the phased array representing a geometric subset of the phased array. Thus, the systems and methods disclosed herein may advantageously allow for fast arbitration even between requests of different configuration types (e.g., requests for a single quadrant vs. requests for multiple quadrants). Fast blanking may advantageously enable freeing up antenna resources for a particular configuration type without, thus superseding a normal arbitration process.

Advantageously, the systems and methods of the subject application may allow for simpler software/hardware interaction. In particular, the systems and methods of the subject application may provide for modular/incremental reconfiguration with little software interaction. Thus, e.g. the systems and methods may allow for redefining of priorities and resources for individual states on the fly (e.g., without the need to re-compute and reload an entire LUT). Look-through/blanking generation and susceptibility may also be redefined on the fly. The systems and methods also provide for the ability to expand the number of requesters without greatly increasing the required memory/logic resources (logic usage increases linearly not exponentially as in the LUT architecture). Moreover, a same arbitration algorithm may be used for any combination of resources required e.g., different Antenna aperture combinations.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIG. 6 depicts arbitration results for an empirical simulation utilizing the exemplary architecture described herein, according to the present disclosure.

DETAILED DESCRIPTION

The present disclosure is directed to an approach to arbitrating, allocating and otherwise managing multiple requests for resources. The approach of the disclosure is applicable in multiple situations in which the number of requests may greatly outweigh the number of resources being requested, and there is a need to switch between the multiple requests and resources very quickly.

Figure 3A:
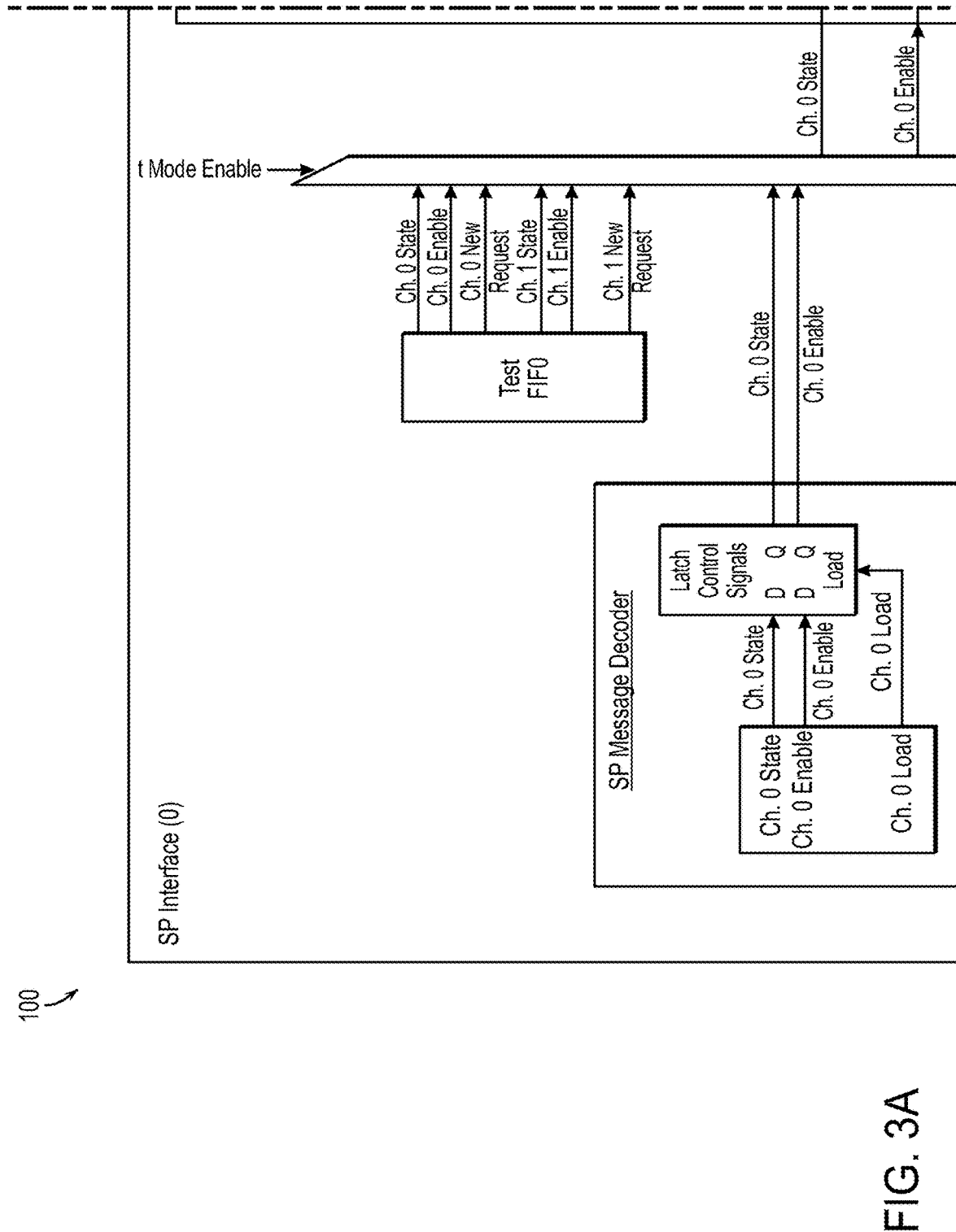
FIGS. 3A-D depict a detailed architecture for an exemplary interface block, according to the present disclosure.
Figure 3B:
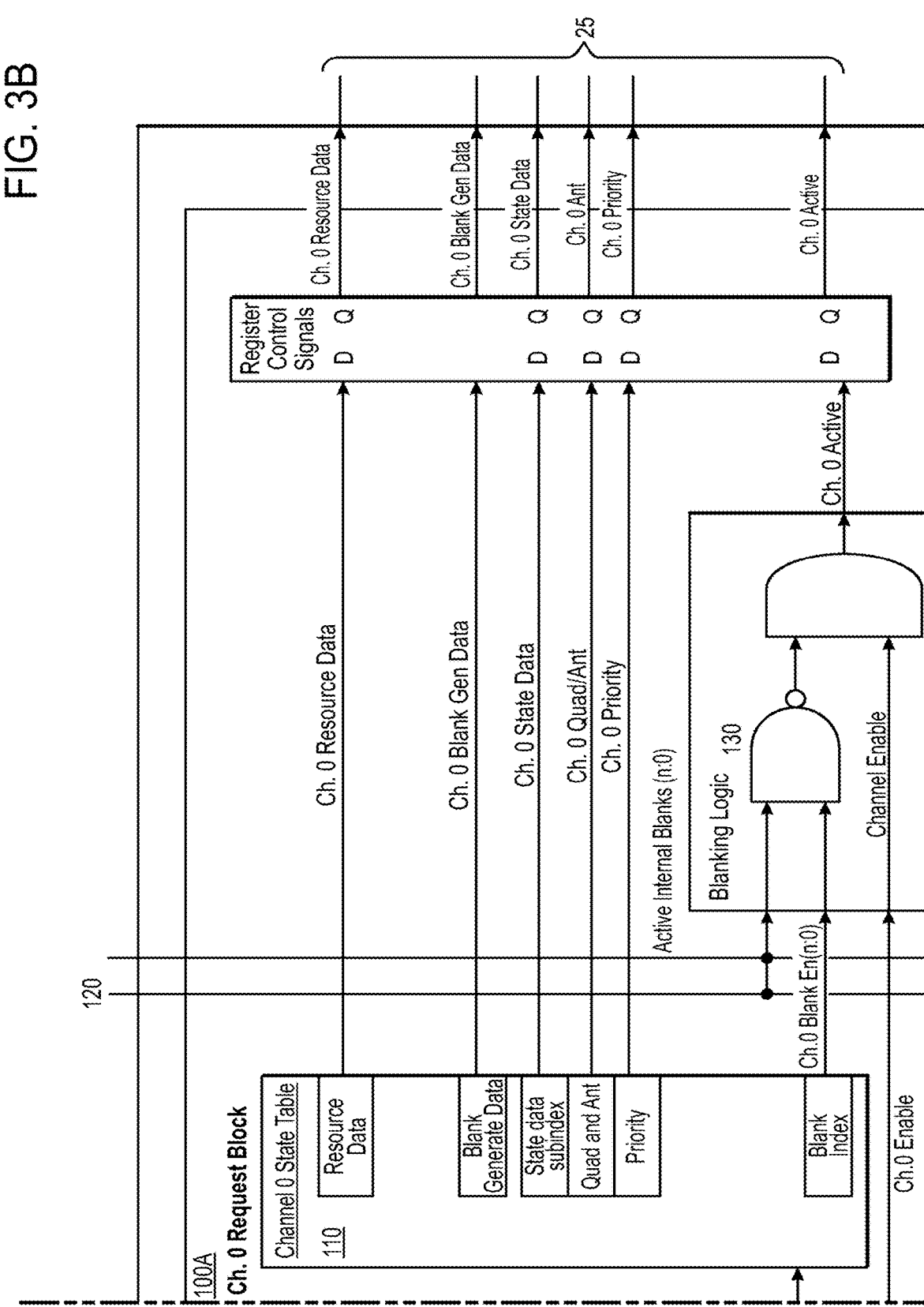
Figure 3C:
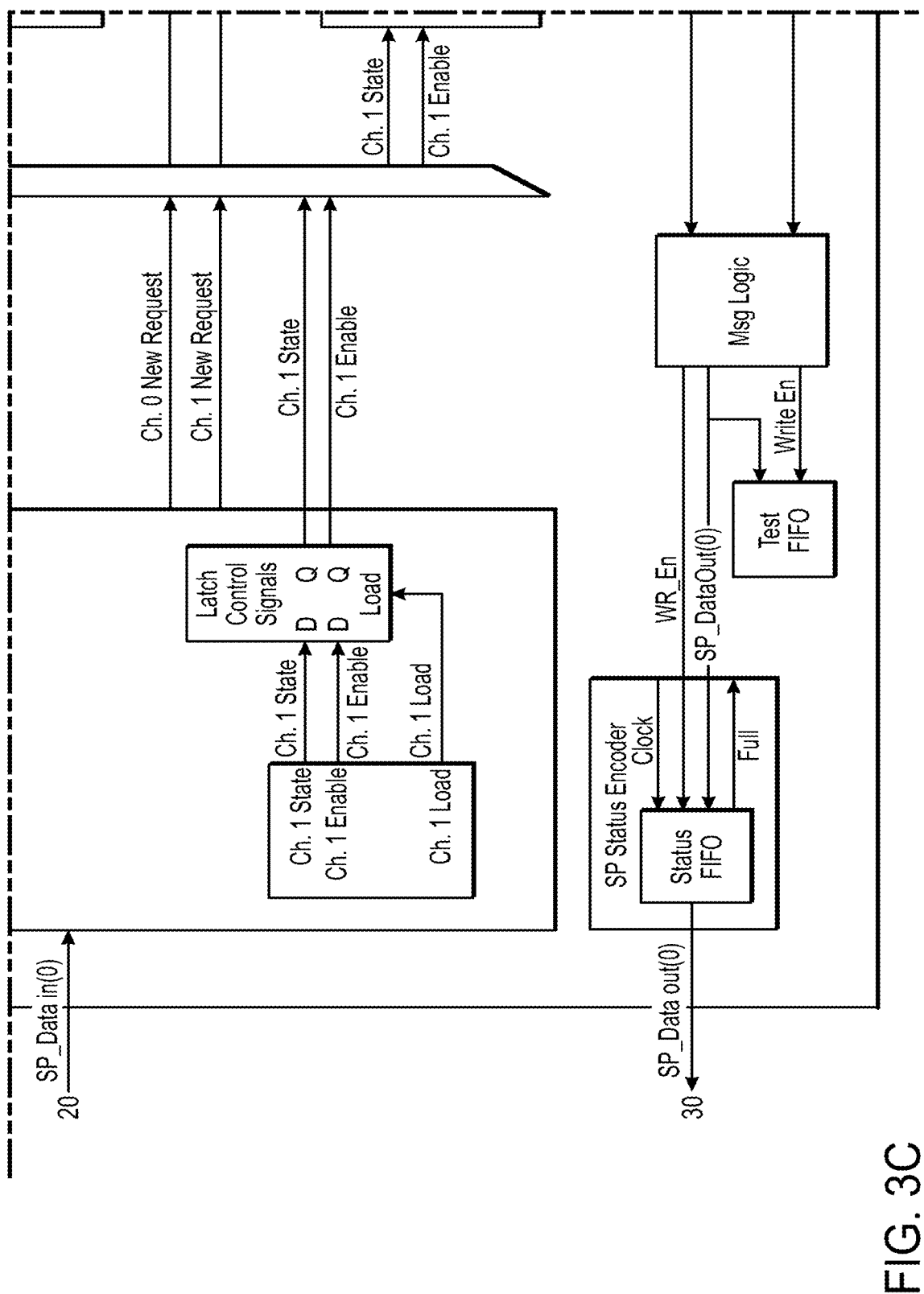
Figure 3D:
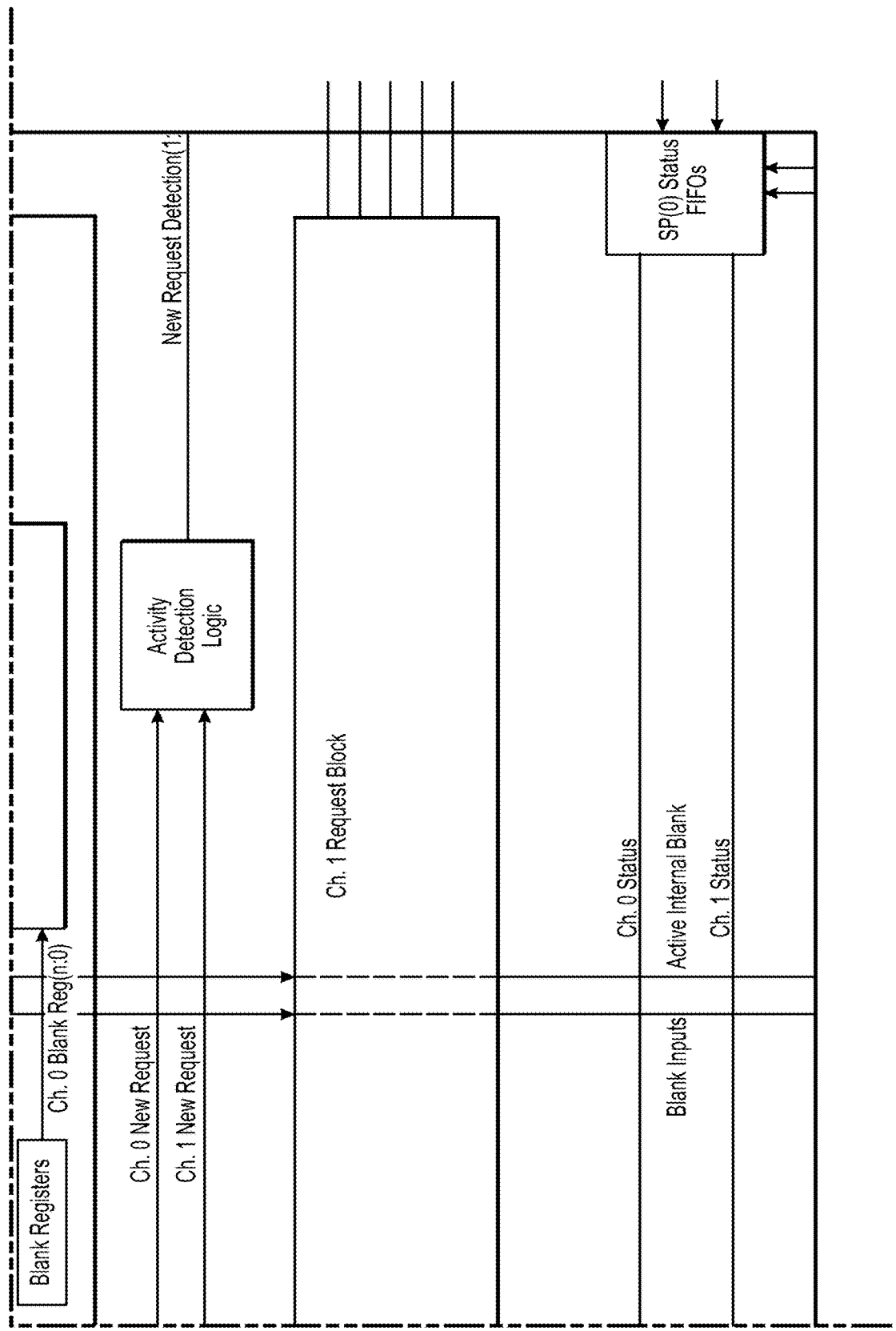

In example embodiments, resources may relate to antenna resources, such as in a pulsed radar system. In a pulsed radar system, jamming or sensing resources, may advantageously be allocated on a sub-pulse level, such that multiple threats can be jammed, and the system can switch between threats very quickly. In order to accomplish this pulsed radar systems make use of a phased array architecture. Thus, in example embodiments, the resources being requested and allocated can include multiple sub-apertures (elements) of a phased-array. In such embodiments, each request for resources may include identification of a specific configuration type, which refers to all valid combinations of elements of the array required to service the request, that is, for example, to transmit and/or receive a specified radar signal. Thus, in exemplary embodiments, the systems and methods described herein may be applied arbitrate between multiple resource requests for generally differing configuration types, having different priorities, at the sub-pulse timing level. In example embodiments, allocation of resources may relate to requests for a specific geometric configuration of said resources. For example, in in the case in which the resources being allocated are segments or elements of a phased array, the requested geometry could be, for example, a circular geometry in which four symmetric quadrants are defined, and each quadrant represents a resource to be allocated. For illustrative purposes, FIG. 3A of U.S. patent application Ser. No. 14/553,139 illustrates an exemplary geometry of a phased-array.

Note that while exemplary embodiments may be directed towards RF resource allocation (such as specifically relating to allocation of antenna resources, e.g., quadrants, in a phased array) it is noted that the subject application is not limited to such embodiments. Rather, the architecture described may be utilized to rapidly arbitrate between requests for any type of signal processing resources that may require prioritization. For example, in some embodiments, the systems and methods may be configured to arbitrate between other types of configurable electronics resources, such as FPGA and other configurable integrated circuit (IC) type resources. In example embodiments, FPGA resources may be utilized in implementing an image-based tracking algorithm, e.g., for tracking an object of interest. Thus, the systems and methods may advantageously be utilized to arbitrate between different tracking requests, each of which may be require tying up FPGA resources. In other embodiments, the systems and methods may be configured to arbitrate between messaging resources. e.g., resources for transmitting, receiving and processing messages. In example, embodiments, resources may be allocated based on message priority, across multiple communication channels. In yet further embodiments, the systems and methods may be configured to arbitrate between memory access requests, e.g., in the case of high bandwidth, multi-port memory interfaces. In yet further embodiments, the systems and methods may be configured to arbitrate between limited medical resources, such as diagnostic resources, based on requester priorities. In yet further embodiments, the systems and methods may be configured to arbitrate between requests for vehicle resources, e.g., electronic control units (ECUs) relating collision avoidance systems including LIDAR/Radar based detection systems. In yet further embodiments, the systems and methods may be configured to arbitrate between computational resources in artificial intelligence applications.

Generally speaking, in exemplary embodiments, systems and methods are presented for arbitrating a signal processing (SP) request. The systems and methods may receive and process a requested SP state to identify for a first a SP channel information regarding (i) signal processing resources required and (ii) state priority, based on a first state table associated with the first SP channel, the first state table defining information for each of a plurality of states for the first SP channel including at least information regarding signal processing resources required and state priority information; and based on the identified information for the first SP channel regarding the signal processing resources required and the state priority, arbitrating as between a current state and a requested state.

In some embodiments, the systems and methods may further determine whether a blank input automatically overrides the requested SP state. For example, in some embodiments, the first state table may further define blank susceptibility information for each of the plurality of states for the first SP channel and the first state table may be used to determine blank susceptibility information for the requested SP state. In example embodiments, blanking logic may be used for comparing the blank input relative to the blank susceptibility information for the requested SP state. Advantageously, the blanking logic may be implemented utilizing a field programmable gate array. In some embodiments, the blank input automatically overrides the requested SP state if the requested state is characterized as susceptible to the blank input.

In exemplary embodiments, arbitrating between a current state and requested state may utilize a field programmable gate array and more particularly may utilize a compare circuit architecture (SaCC). In some embodiments, the priority information for the requested SP state may be compared against all quadrants. A win/may then be assigned for the requested SP state based on a checking of the most significant digit relative to the comparison results against all quadrants.

Figure 1:
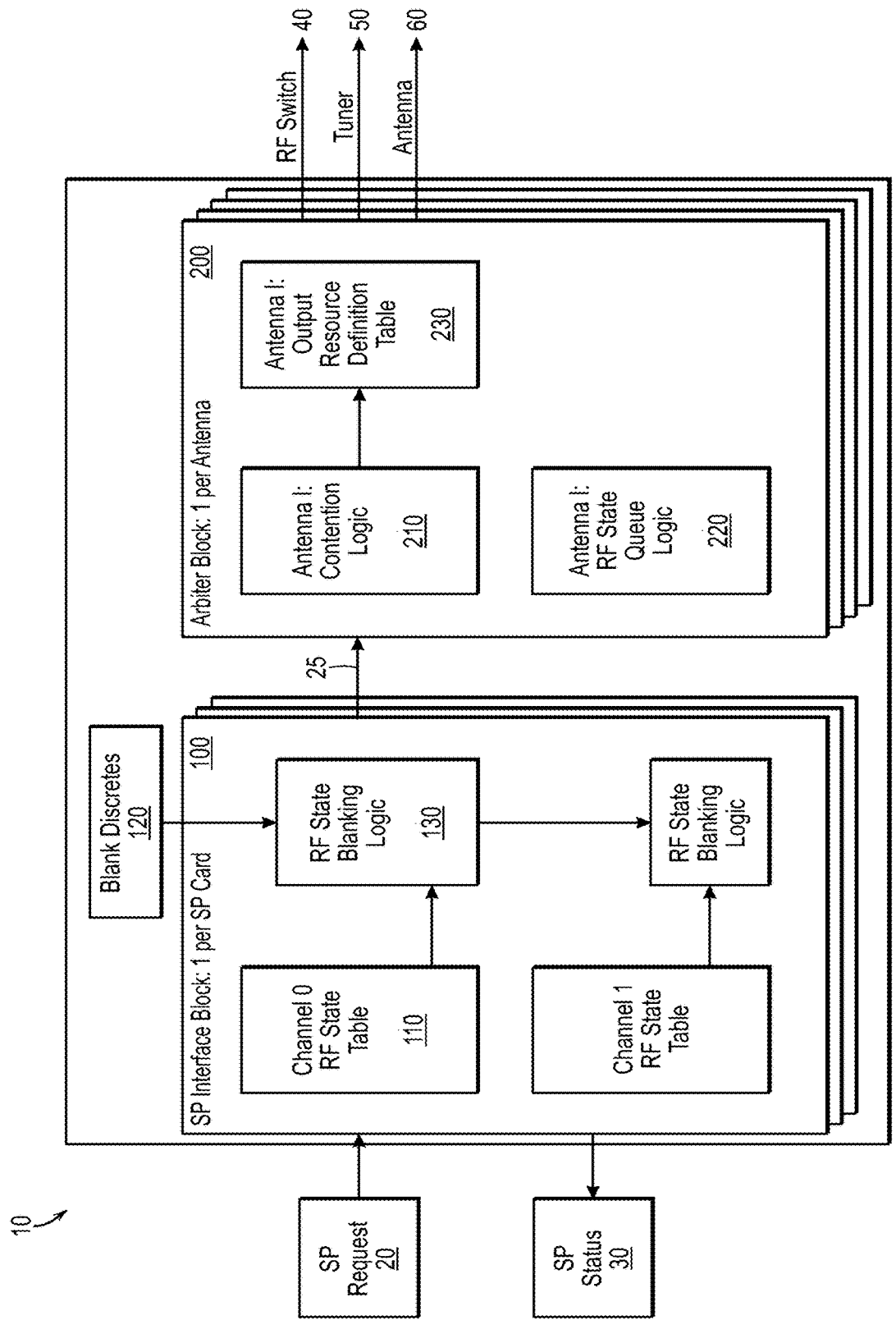
FIG. 1 depicts a schematic block diagram providing an overview of an exemplary system architecture for processing a signal processing (SP) resource request, according to the present disclosure.

FIG. 1 depicts a schematic block diagram providing an overview of an exemplary system architecture for processing a signal processing (SP) resource request. The system architecture may advantageously include one or more SP interface blocks 100 (e.g., one per SP card) and one or more arbitrator blocks 200 (e.g., one per resource). A system 10 implementing the system architecture may receive e.g., an SP request 20. The SP request 20 may be pre-processed through the SP interface block 100 as later described in greater detail herein and routed 25 to an arbiter block 200 for arbitration of a requested signal processing state, which may, e.g., be an RF state against a current antenna configuration. The system 10 may provide a SP status 30, e.g., based on the results of the arbitration block 200. Moreover, depending on the results of the arbiter block 200, signal processing resources may be allocated. For example, in some embodiments an RF switch, tuner and antenna parameters 40, 50 and 60 may be utilized to allocate antenna resources. Advantageously the system 10, may implement real-time, fast blanking control, e.g., using FPGA logic (which is notably different than a RAM based solution). Moreover, the system 10 may utilize simple fast SaCC for arbitration. These and other advantageous and aspects of the system 10 are described in greater detail in the sections which follow.

Figure 2:
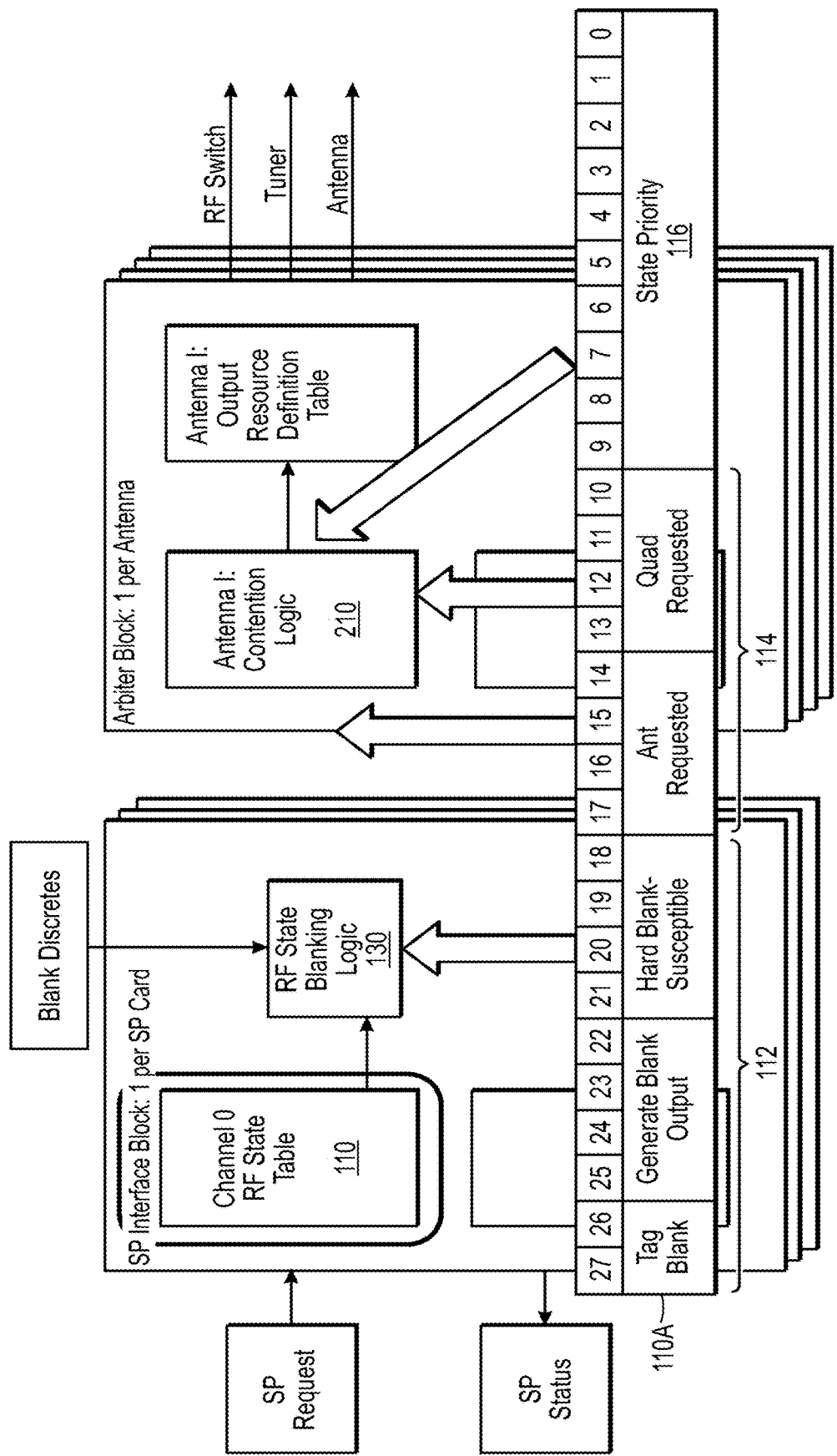
FIG. 2 depicts an exemplary RF state entry which may be included in an RF state table, according to the present disclosure.

With reference still to FIG. 1, each SP interface block may include one or more SP state tables 110 (e.g., one state table per SP channel). Each state table 110, may include N states for a given SP channel. Each state in the state table, may generally include (i) deployment parameters characterizing the signal processing resources for that state, (ii) blank generation and susceptibility information for the state and (iii) priority information for the state. For example, in the context of antenna resources, the state table may be an RF state table which includes a plurality of RF states each including (i) information regarding antenna resources (e.g., quadrant) required (ii) blank generation and susceptibility information, and (iii) RF state priority information. FIG. 2 depicts an exemplary RF state entry 110A which may be included in an RF state table, e.g., in state table 110 as well as how the data is utilized by the interface block 100 and the arbitrator block 200. In particular, blank data and susceptibility information 112 may be utilized by RF state blanking logic 130 in the interface block 100 and antenna resource information 114 and priority information 116 may be utilized by antenna contention logic 210 of the arbiter block 200.

With continued reference to FIG. 1, the interface block 100 of system 10 may implement state blanking logic 130. More particularly, certain states may be predetermined to be susceptible to certain blank inputs, e.g., as defined via a blank discrete input 120. Applicable blank inputs are automatically according highest priority. Thus, if a given state is susceptible to a given blank input the blank input automatically overrides any current state. Blank susceptibility for each state is defined in the state tables, e.g., in state table 110.

With further reference to FIG. 1, the arbiter block 200 of system 10 may implement resource contention logic 210 arbitrating a requested state, e.g., against a current resource configuration. Advantageously, in some embodiments, as later described in greater detail herein, the contention logic 210 operation may determine win/loss of a requesting state based at least in part on the required resources, e.g., in an application involving antenna resources, based on the antenna quadrant needed. Thus in some embodiments, the contention logic 210 may utilize both priority and resource information in determining arbitration results.

With reference now to FIGS. 3A-D, a detailed architecture for an exemplary interface block 100 is depicted. A new SP request 20 may be provided, e.g., SP_DataIn( ) The interface block 10 may include an SP message decoder for parsing the SP request 20 and provide latch control signals to the channel specific requester blocks, e.g., channel 0 requester block 100A. As previously discussed the channel specific requester block may include an RF state table 110 which may include (i) information regarding antenna resources (e.g., quadrant) required (ii) blank generation and susceptibility information, and (iii) RF state priority information. Notably, blanking susceptibility controls are relatively static and therefore can be efficiently and effectively implemented as software. Blanking logic 130 may utilize FPGA logic to quickly compare blanking inputs 120 to blanking susceptibility for the RF state implicated by the SP request 20 as stored in the RF state table 110. Blanking logic 130 is configured to immediately remove blanked resources from active state. Data from the RF state table (e.g., resource data, blank generate data, state-data sub index, quad and antenna data and priority data) and output information from the blanking logic 130 (e.g., channel active/inactive) is routed 25 to the arbiter block 200. SP status for a given request is returned (first-in-first out) based on arbitration results from the arbiter block 200 to the interface block 100 which is then encoded into an SP status message 30.

Figure 4A:
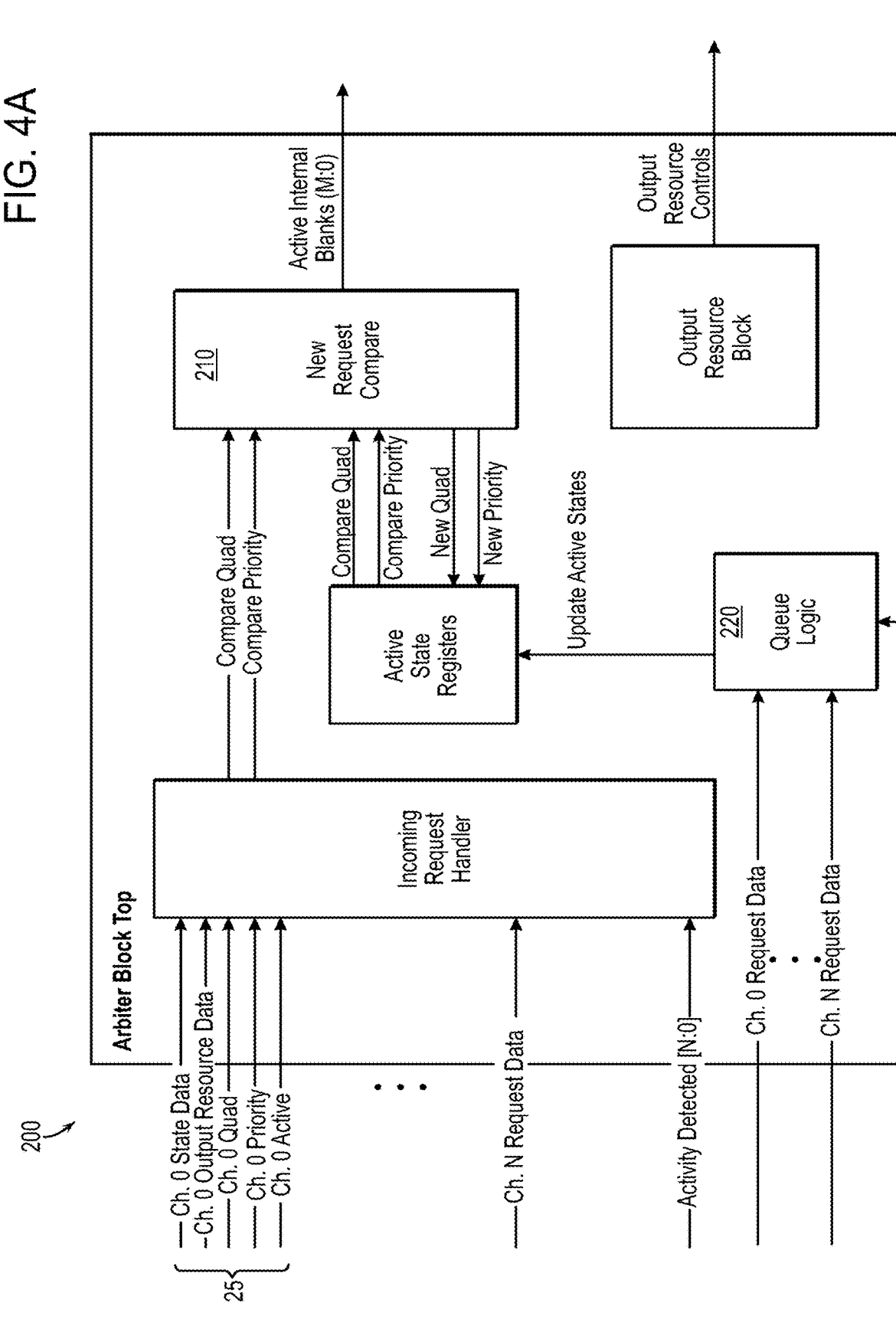
FIGS. 4A-B depict a detailed architecture for an exemplary arbiter block, according to the present disclosure.
Figure 4B:
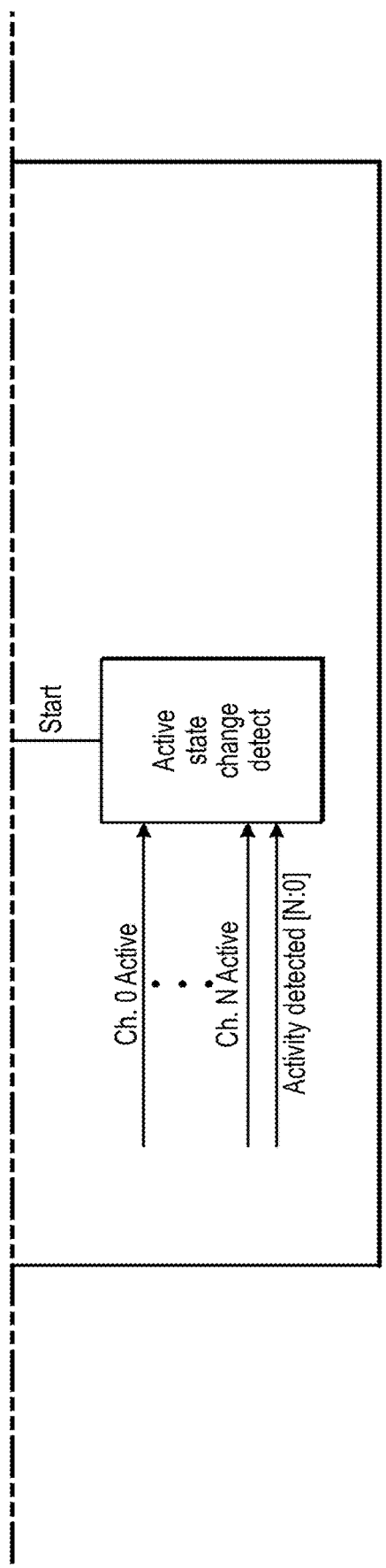

With reference now to FIGS. 4A-B, a detailed architecture for an exemplary arbiter block 200 is depicted. The arbiter block 200 receives the routed data 25 relating to a channel request from the interface block 100. An incoming request handler may advantageously parse the data and provides compare quad and compare priority information to the contention logic 210. Notably arbiter block 200 may further implement a queue logic 220 for queuing requests which are not immediately prioritized. Advantageously, the queue logic may sort all active requests all sorted in priority. The queue logic includes active requests also; all sorted by priority. When a request is disabled or blanked the queue logic performs arbitration on all the active requests in the system, yielding only the highest priority requests to remain or become active in the system.

Figure 5:
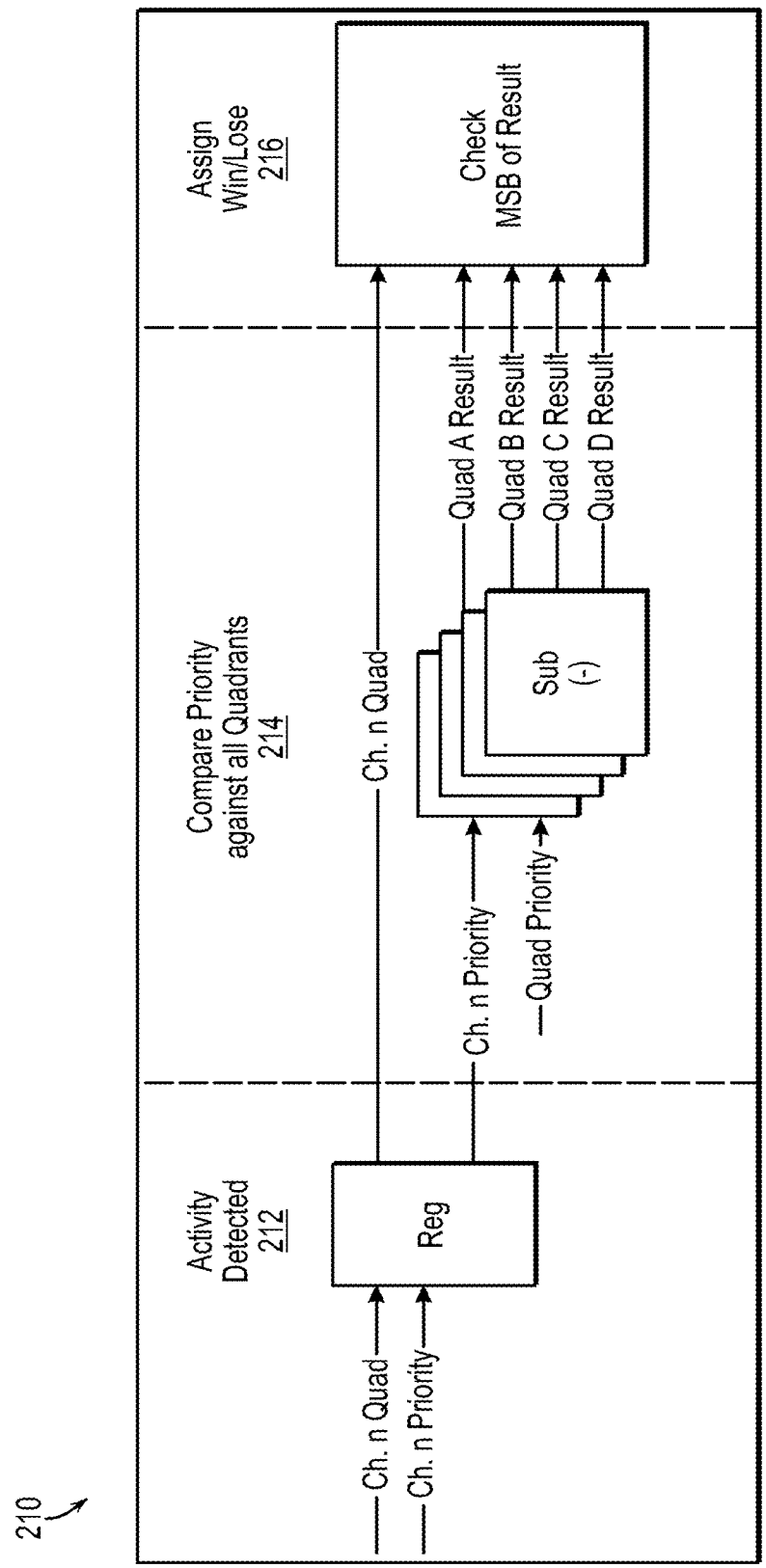
FIG. 5 depicts a detailed flow diagram of an exemplary embodiment of contention logic for an arbiter block, according to the present disclosure.

With reference now to FIG. 5 a detailed flow diagram of an exemplary embodiment of the contention logic 210 is depicted as implemented utilizing FPGA. Activity is detected and stored in registers at step 212. More particularly, quadrant and priority information for a particular channel as indicated by a particular requested are loaded into registers. Next, at step 214 the priority for the request is compared against all quadrants, e.g., using SaCC. Finally, at step 216 a win/loss is assigned for the request, e.g., based on a checking the most significant digit (MSB) relative to the comparison results. This architecture advantageously enables immediately comparing a current state to new incoming state. As noted above, non-prioritized states may be queued for subsequent consideration.

With reference to FIG. 6 arbitration results for an empirical simulation utilizing the exemplary architecture described herein is depicted. The results indicate that the captured data matched the expected data with respect to the action taken. Moreover, the results indicate a rapid response time with respect to new requests.

Various embodiments of the above-described systems and methods may be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., Microsoft® Internet Explorer® available from Microsoft Corporation, Mozilla® Firefox available from Mozilla Corporation). The mobile computing device includes, for example, a Blackberry®, iPAD®, iPhone® or other smartphone device.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

The invention claimed is:

1. A system for arbitrating a signal processing (SP) request the system comprising:
   an interface block configured for receiving and processing a requested SP state to identify for a first SP channel information regarding (i) signal processing resources required and (ii) state priority, based on a first state table associated with the first SP channel, the first state table defining information for each of a plurality of states for the first SP channel including at least information regarding signal processing resources required and state priority information; and
   an arbiter block configured to receive the identified information for the first SP channel regarding the signal processing resources required and the state priority and based thereon arbitrating as between a current state and a requested state;
   wherein the interface block is further configured determine whether a blank input automatically overrides the requested SP state;
   wherein the first state table further defines blank susceptibility information for each of the plurality of states for the first SP channel and wherein the first state table is used to determine blank susceptibility information for the requested SP state; and
   wherein the interface block further includes blanking logic for comparing the blank input relative to the blank susceptibility information for the requested SP state.

2. The system of claim 1, wherein the blanking logic is implemented utilizing a field programmable gate array.

3. The system of claim 1, wherein the blank input automatically overrides the requested SP state if the requested state is characterized as susceptible to the blank input.

4. The system of claim 1, wherein the arbitrating as between a current state and requested state utilizes a field programmable gate array.

5. The system of claim 4, wherein the arbitrating as between a current state and requested state utilizes subtract and compare circuit architecture (SaCC).

6. The system of claim 1, wherein the blank susceptibility information defines a set of blanking inputs that would be capable of overriding the requested SP state.

7. The system of claim 1, wherein the blank susceptibility information is different for different states.

8. The system of claim 1, wherein the information for each of the plurality of SP states in the first state table further includes information regarding signal processing resources required and state priority information.

9. The system of claim 1, wherein the automatic overriding of the requested SP state is configured for removing resources associated with the requested SP state from active state.

10. The system of claim 1, wherein if the requested SP state is overridden, queue logic is configured to perform arbitration on all other active requests in the system for different SP states on a priority basis.

11. The system of claim 1, wherein the overriding the requested SP state for the first SP channel is configured to free up resources for a different SP state.

12. The system of claim 1, wherein each SP state is one of a plurality of configurations types of a phased array system, the phased array system including a plurality of elements arranged in a particular geometry, wherein each configuration type is characterized by one or more geometric constraints defining a set of all possible configurations of the phased array that are able to satisfy resource requests of that configuration type, each configuration in the set of all possible configurations including a specific combination of one or more elements of the phased array representing a geometric subset of the phased array.

13. A system for arbitrating a signal processing (SP) request the system comprising:
an interface block configured for receiving and processing a requested SP state to identify for a first SP channel information regarding (i) signal processing resources required and (ii) state priority, based on a first state table associated with the first SP channel, the first state table defining information for each of a plurality of states for the first SP channel including at least information regarding signal processing resources required and state priority information; and
an arbiter block configured to receive the identified information for the first SP channel regarding the signal processing resources required and the state priority and based thereon arbitrating as between a current state and a requested state;
wherein the signal processing resources are RF resources in a phased-array and wherein the priority information for the requested SP state is compared against all quadrants of the phased array.

14. The system of claim 13, wherein the interface block is further configured determine whether a blank input automatically overrides the requested SP state.

15. The system of claim 14, wherein the first state table further defines blank susceptibility information for each of the plurality of states for the first SP channel and wherein the first state table is used to determine blank susceptibility information for the requested SP state.

16. The system of claim 15, wherein the interface block further includes blanking logic for comparing the blank input relative to the blank susceptibility information for the requested SP state.

17. The system of claim 13, wherein a win/loss is assigned for the requested SP state based on a checking of the most significant digit relative to the comparison results against each of the quadrants.

18. A method for arbitrating a signal processing (SP) request the method comprising:
receiving and processing a requested SP state to identify for a first SP channel information regarding (i) signal processing resources required and (ii) state priority, based on a first state table associated with the first SP channel, the first state table defining information for each of a plurality of states for the first SP channel including at least information regarding signal processing resources required and state priority information; and
based on the identified information for the first SP channel regarding the signal processing resources required and the state priority, arbitrating as between a current state and a requested state;
the method further comprising determining whether a blank input automatically overrides the requested SP state;
wherein the first state table further defines blank susceptibility information for each of the plurality of states for the first SP channel and wherein the first state table is used to determine blank susceptibility information for the requested SP state; and
wherein blanking logic is utilized to compare the blank input relative to the blank susceptibility information for the requested SP state.

19. The method of claim 18, wherein the blanking logic is implemented utilizing a field programmable gate array.

20. The method of claim 18, wherein the blank input automatically overrides the requested SP state if the requested RF state is characterized as susceptible to the blank input.

21. The method of claim 18, wherein the arbitrating as between a current state and requested state utilizes a field programmable gate array.

22. The method of claim 21, wherein the arbitrating as between a current state and requested state utilizes subtract and compare circuit architecture (SaCC).

23. The method of claim 18, wherein the blank susceptibility information defines a set of blanking inputs that would be capable of overriding the requested SP state.

24. The method of claim 18, wherein the blank susceptibility information is different for different states.

25. The system of claim 18, wherein the automatic overriding of the requested SP state is configured for removing resources associated with the requested SP state from active state.

26. The method of claim 18, wherein the information for each of the plurality of SP states in the first state table further includes information regarding signal processing resources required and state priority information.

27. The method of claim 18, wherein if the requested SP state is overridden, queue logic performs arbitration on all other active requests in the system for different SP states on a priority basis.

28. The method of claim 18, wherein the overriding the requested SP state for the first SP channel is configured to free up resources for a different SP state.

29. The method of claim 18, wherein each SP state is one of a plurality of configurations types of a phased array system, the phased array system including a plurality of elements arranged in a particular geometry, wherein each configuration type is characterized by one or more geometric constraints defining a set of all possible configurations of the phased array that are able to satisfy resource requests of that configuration type, each configuration in the set of all possible configurations including a specific combination of one or more elements of the phased array representing a geometric subset of the phased array.

30. A method for arbitrating a signal processing (SP) request the method comprising:

receiving and processing a requested SP state to identify for a first SP channel information regarding (i) signal processing resources required and (ii) state priority, based on a first state table associated with the first SP channel, the first state table defining information for each of a plurality of states for the first SP channel including at least information regarding signal processing resources required and state priority information; and based on the identified information for the first SP channel regarding the signal processing resources required and the state priority, arbitrating as between a current state and a requested state;

wherein the signal processing resources are RF resources in a phased-array and wherein the priority information for the requested SP state is compared against all quadrants of the phased array.

31. The method of claim 30, further comprising determining whether a blank input automatically overrides the requested SP state.

32. The method of claim 31, wherein the first state table further defines blank susceptibility information for each of the plurality of states for the first SP channel and wherein the first state table is used to determine blank susceptibility information for the requested SP state.

33. The method of claim 32, wherein blanking logic is utilized to compare the blank input relative to the blank susceptibility information for the requested SP state.

34. The method of claim 30, wherein a win/loss is assigned for the requested SP state based on a checking of the most significant digit relative to the comparison results.

* * * * *